(12) United States Patent
Festes et al.

(10) Patent No.: US 12,535,966 B2
(45) Date of Patent: Jan. 27, 2026

(54) SYSTEM AND METHOD FOR IMPLEMENTING TEMPERATURE COMPENSATION IN A MEMORY DEVICE

(71) Applicant: Silicon Storage Technology, Inc., San Jose, CA (US)

(72) Inventors: Gilles Festes, Fuveau (FR); Steven Lemke, Boulder Creek, CA (US); Louisa Schneider, San Jose, CA (US); Henry A. Om'Mani, Santa Clara, CA (US); Hieu Van Tran, San Jose, CA (US)

(73) Assignee: Silicon Storage Technology, Inc., San Jose, CA (US)

( * ) Notice: Subject to any disclaimer, the term of this patent is extended or adjusted under 35 U.S.C. 154(b) by 308 days.

(21) Appl. No.: 18/367,921

(22) Filed: Sep. 13, 2023

(65) Prior Publication Data

US 2025/0085884 A1    Mar. 13, 2025

(51) Int. Cl.
     *G06F 3/06*    (2006.01)

(52) U.S. Cl.
     CPC .......... *G06F 3/0655* (2013.01); *G06F 3/0619* (2013.01); *G06F 3/0673* (2013.01)

(58) Field of Classification Search
None
See application file for complete search history.

(56) References Cited

U.S. PATENT DOCUMENTS

| | | |
|---|---|---|
| 4,991,141 A | 2/1991 | Tran |
| 5,029,130 A | 7/1991 | Yeh |
| 5,327,386 A | 7/1994 | Fudeyasu |
| 6,947,325 B2 | 9/2005 | Kaneda |
| 7,315,056 B2 | 1/2008 | Klinger |

(Continued)

FOREIGN PATENT DOCUMENTS

| | | |
|---|---|---|
| TW | 200721177 | 6/2007 |
| TW | 201034014 A | 9/2010 |

OTHER PUBLICATIONS

PCT Search Report & Written Opinion mailed on May 14, 2024 corresponding to the related PCT Patent Application No. PCT/US2023/033253.

*Primary Examiner* — Michael Alsip
(74) *Attorney, Agent, or Firm* — DLA Piper LLP (US)

(57) ABSTRACT

A method of operating memory cells includes programming memory cells at a first temperature to different program states associated with first read current values confirmed by using nominal read conditions. Modified read conditions are determined such that a second read current for the one memory cells at a second temperature is approximately equal to the first read current value for the one memory cell. A read operation is performed on the memory cells at the second temperature using the modified read conditions to determine respective third read current values. Error read current values are determined as respective differences between the first and third read current values. Upper and lower program states are assigned to respective desired program states, with read currents that correspond approximately to respective determined error read current values, and are separated approximately by a respective target read current value associated with the respective desired program state.

20 Claims, 15 Drawing Sheets

(56) References Cited

U.S. PATENT DOCUMENTS

| | | | |
|---|---|---|---|
| 7,927,994 | B1 | 4/2011 | Liu et al. |
| 10,586,598 | B2 | 3/2020 | Tiwari |
| 10,998,041 | B1 * | 5/2021 | Avraham ............ G11C 29/4401 |
| 11,170,838 | B2 * | 11/2021 | Bayat ........................ G11C 8/08 |
| 2005/0237798 | A1 | 10/2005 | Urabe |
| 2010/0046302 | A1 | 2/2010 | Ogura |
| 2012/0224425 | A1 | 9/2012 | Fai et al. |
| 2015/0029778 | A1 | 1/2015 | Yoon |
| 2015/0318043 | A1 | 11/2015 | Chishti |
| 2017/0271031 | A1 * | 9/2017 | Sharon ................... G11C 29/52 |
| 2017/0365349 | A1 * | 12/2017 | Pang ....................... G11C 16/24 |
| 2019/0189202 | A1 * | 6/2019 | Avraham ............ G11C 16/3418 |
| 2019/0286442 | A1 * | 9/2019 | Takizawa ................. G06F 11/08 |
| 2020/0105353 | A1 * | 4/2020 | Sharon ................. G11C 29/021 |
| 2022/0230680 | A1 * | 7/2022 | Wu ..................... G11C 11/5678 |

\* cited by examiner

| Program State Level # | TRC (nA) | Icell- (nA) | Icell+ (nA) |
|---|---|---|---|
| 31 | 96 | 1 | 97 |
| 30 | 93 | 2 | 95 |
| 29 | 90 | 2 | 93 |
| 28 | 87 | 3 | 90 |
| 27 | 84 | 4 | 88 |
| 26 | 81 | 4 | 85 |
| 25 | 78 | 5 | 83 |
| 24 | 75 | 6 | 81 |
| 23 | 72 | 6 | 78 |
| 22 | 69 | 7 | 76 |
| 21 | 66 | 8 | 74 |
| 20 | 63 | 8 | 71 |
| 19 | 60 | 9 | 69 |
| 18 | 57 | 10 | 67 |
| 17 | 54 | 10 | 64 |
| 16 | 51 | 11 | 62 |
| 15 | 48 | 12 | 60 |
| 14 | 45 | 13 | 58 |
| 13 | 42 | 14 | 56 |
| 12 | 39 | 14 | 53 |
| 11 | 36 | 16 | 52 |
| 10 | 33 | 17 | 50 |
| 9 | 30 | 18 | 48 |
| 8 | 27 | 19 | 46 |
| 7 | 24 | 20 | 44 |
| 6 | 21 | 21 | 42 |
| 5 | 18 | 22 | 40 |
| 4 | 15 | 23 | 38 |
| 3 | 12 | 25 | 37 |
| 2 | 9 | 26 | 35 |
| 1 | 6 | 27 | 33 |
| 0 | 3 | 29 | 32 |

FIG. 15

SYSTEM AND METHOD FOR IMPLEMENTING TEMPERATURE COMPENSATION IN A MEMORY DEVICE

FIELD OF THE INVENTION

The present invention relates to non-volatile memory arrays.

BACKGROUND OF THE INVENTION

Memory devices with split gate non-volatile memory cells, and arrays of such cells, are well known. For example, U.S. Pat. No. 5,029,130 ("the '130 patent") discloses an array of split gate non-volatile memory cells. The memory cell is shown in FIG. 1. Each memory cell 10 includes source and drain regions 14/16 formed in a semiconductor substrate 12, with a channel region 18 there between. A floating gate 20 is formed over and insulated from (and controls the conductivity of) a first portion of the channel region 18, and over a portion of the drain region 16. A control gate 22 (also referred to a word line gate or select gate) has a first portion 22b that is disposed over and insulated from (and controls the conductivity of) a second portion of the channel region 18, and a second portion 22c that extends up and over the floating gate 20. The floating gate 20 and control gate 22 are insulated from the substrate 12 by a gate oxide 26.

The memory cell is erased (where electrons are removed from the floating gate) by placing a high positive voltage on the control gate 22, which causes electrons on the floating gate 20 to tunnel through the intermediate insulation (e.g., a tunnel oxide) 24 from the floating gate 20 to the control gate 22 via Fowler-Nordheim tunneling.

The memory cell is programmed (where electrons are placed on the floating gate) by placing a positive voltage on the control gate 22, and a positive voltage on the drain 16. Electron current will flow from the source 14 towards the drain 16. The electrons will accelerate and become heated when they reach the gap between the control gate 22 and the floating gate 20. Some of the heated electrons will be injected through the gate oxide 26 onto the floating gate 20 due to the attractive electrostatic force from the floating gate 20.

The memory cell is read by placing positive read voltages on the drain 16 and control gate 22 (which turns on the channel region under the control gate). If the floating gate 20 is positively charged (i.e. erased of electrons and positively coupled to the drain 16), then the portion of the channel region under the floating gate 20 is turned on as well, and current will flow across the channel region 18, which is sensed as the erased or "1" state. If the floating gate 20 is negatively charged (i.e. programmed with electrons), then the portion of the channel region under the floating gate 20 is mostly or entirely turned off, and current will not flow (or there will be little flow) across the channel region 18, which is sensed as the programmed or "0" state.

The architecture of the memory array is shown in FIG. 2. The memory cells 10 are arranged in rows and columns. In each column, the memory cells are arranged end to end in mirror fashion, so that they are formed as pairs of memory cells each sharing a common source region 14 (S), and each adjacent set of memory cell pairs sharing a common drain region 16 (D). All the source regions 14 (S) for any given row of memory cells are electrically connected together by a source line 14a. Optionally, a group of the source lines 14a, or all the source lines 14a in the memory array, can be electrically connected together by a common source line 14b. All the drain regions 16 (D) for any given column of memory cells are electrically connected together by a bit line 16a. All the control gates 22 for any given row of memory cells are electrically connected together by a control gate line 22a (also called word lines or select gate lines). Therefore, while the memory cells can be individually programmed and read, memory cell erasure is performed row by row (each row of memory cells is erased together, by the application of a high voltage on the control gate line 22a). Row and column decoders decode incoming row and column addresses and provide the appropriate voltages to the control gate lines 22a and bit lines 16a, respectively. A sense amplifier senses the voltages or currents on the bit lines during read operations.

Those skilled in the art understand that the source and drain can be interchanged, where the floating gate can extend partially over the source instead of the drain, as shown in FIG. 3. FIG. 4 best illustrates the corresponding memory cell architecture, including the memory cells 10, the source lines 14a, the bit lines 16a, and the control gate lines 22a. As is evident from the figures, memory cells 10 of the same row share the same source line 14a and the same control gate line 22a, while the drains of all cells of the same column are electrically connected to the same bit line 16a. The array design permits individual programming of the selected cells, e.g., by applying 1.6 V and 7.6 V to the selected control gate line 22a and source line 14a, respectively, and grounding the selected bit line 16a. Disturbing the non-selected memory cell in the same pair is avoided by applying a voltage greater than 2 volts on the unselected bit lines 16a and grounding the remaining lines.

Split gate memory cells having more than two gates are also known. For example, memory cells have source region 14, drain region 16, floating gate 20 over a first portion of channel region 18, a control gate 22 over a second portion of the channel region 18, a coupling gate 28 over the floating gate 20, and an erase gate 30 over the source region 14 are known, as shown in FIG. 5. It should be noted that coupling gates are sometimes referred to as control gates, but will only be referred to as coupling gates herein for clarity (so they may be distinguished from the control gates 22 used to control a portion of the channel region 18). Programming is shown by heated electrons from the channel region 18 injecting themselves onto the floating gate 20. Erasing is shown by electrons tunneling from the floating gate 20 to the erase gate 30 by the application of a high positive voltage on the erase gate 30.

The architecture for a four-gate memory cell array can be configured as shown in FIG. 6. In this embodiment, each horizontal control gate line 22a electrically connects together all the control gates 22 for that row of memory cells. Each horizontal coupling gate line 28a electrically connects together all the coupling gates 28 for that row of memory cells. Each horizontal source line 14a electrically connects together all the source regions 14 for two rows of memory cells that share the source regions 14. Each bit line 16a electrically connects together all the drain regions 16 for that column of memory cells. Each erase gate line 30a electrically connects together all the erase gates 30 for two rows of memory cells that share the erase gates 30. As with the previous architecture, individual memory cells can be independently programmed and read. Erasing is performed by placing a high positive voltage on the erase gate line 30a, which results in the simultaneous erasing of both rows of the memory cells that share the same erase gate line 30a. Exemplary operating voltages can include those in Table 1 below, where selected lines (Sel.) are those that include the targeted memory cell(s), and unselected lines (Unsel.) are the remaining lines not including the targeted memory cell(s):

TABLE 1

| | CG 22a | | BL 16a | | SL 14a | | CG 28a | | EG 30a | |
|---|---|---|---|---|---|---|---|---|---|---|
| | Sel. | Unsel. | Sel. | Unsel. | Sel. | Unsel. | Sel. | Unsel. | Sel. | Unsel. |
| Erase | 0 V | 0 V | 0 V | 0 V | 0 V | 0 V | 0 V | 0 V | 11.5 V | 0 V |
| Read | 2.5 V | 0 V | 0.8 V | 0 V | 0 V | 0 V | 2.5 V | 2.5 V | 0 V | 0 V |
| Program | 1 V | 0 V | 1 µA | 2.5 V | 4.5 V | 0.5 V | 10.5 V | 0/2.5 V | 4.5 V | 0.5 V |

Split gate non-volatile memory cells having three conductive gates, and arrays of such cells, are also known. For example, U.S. Pat. No. 7,315,056 ("the '056 patent") discloses an array of split gate non-volatile memory cells. The memory cell is shown in FIG. 7. Each memory cell 10 includes source and drain regions 14/16 formed in a semiconductor substrate 12, with a channel region 18 there between. A floating gate 20 is formed over and insulated from (and controls the conductivity of) a first portion of the channel region 18, and over a portion of the source region 14. A control gate 22 has a first portion 22b that is disposed over and insulated from (and controls the conductivity of) a second portion of the channel region 18, and a second portion 22c that extends up and over the floating gate 20. A program/erase gate 32 has a first portion 32a disposed over the source region 14 and is laterally adjacent to the floating gate 20, and a second portion 32b that extends up and over the floating gate 20.

The memory cell is erased (where electrons are removed from the floating gate) by placing a high positive voltage on the program/erase gate 32, which causes electrons on the floating gate 20 to tunnel through the intermediate insulation from the floating gate 20 to the program/erase gate 32 via Fowler-Nordheim tunneling.

The memory cell is programmed (where electrons are placed on the floating gate) by placing a positive voltage on the control gate 22, and a positive voltage on the source region 14 and a positive voltage on the program/erase gate 32. Electron current will flow from the drain 16 towards the source 14. The electrons will accelerate and become heated when they reach the gap between the control gate 22 and the floating gate 20. Some of the heated electrons will be injected through the gate oxide onto the floating gate 20 due to the attractive electrostatic force from the floating gate 20.

The memory cell is read by placing positive read voltages on the drain 16 and control gate 22 (which turns on the channel region 18 under the control gate 22). If the floating gate 20 is positively charged (i.e. erased of electrons and positively coupled to the source 14), then the portion of the channel region 18 under the floating gate 20 is turned on as well, and current will flow across the channel region 18, which is sensed as the erased or "1" state. If the floating gate 20 is negatively charged (i.e. programmed with electrons), then the portion of the channel region under the floating gate 20 is mostly or entirely turned off, and current will not flow (or there will be little flow) across the channel region 18, which is sensed as the programmed or "0" state.

Example operating voltages can be:

TABLE 2

| Operation | Control Gate (22) | Drain (16) | PE Gate (32) | Source (14) |
|---|---|---|---|---|
| Erase | 0 | 0 | 10-12 Volts | 0 |
| Program | 1-2 Volts | ~1 µA | 4-6 Volts | 6-8 Volts |
| Read | 1.5-3.3 Volts | 0.5-1.0 Volts | 0 | 0 |

The architecture of the memory array is shown in FIG. 8. The memory cells 10 are arranged in rows and columns. In each column, the memory cells are arranged end to end in mirror fashion, so that they are formed as pairs of memory cells each sharing a common source region 14, and each adjacent set of memory cell pairs sharing a common drain region 16. All the source regions 14 for any given row of memory cells are electrically connected together by a source line 14a. All the drain regions 16 for any given column of memory cells are electrically connected together by a bit line 16a. All the control gates 22 for any given row of memory cells are electrically connected together by a control gate line 22a. All the program/erase gates 32 for any given row of memory cells are electrically connected together by a program/erase gate line 32a. Therefore, while the memory cells can be individually programmed and read, memory cell erasure is performed by pairs of rows (each pair of rows of memory cells sharing program/erase gates 32 are erased together, by the application of a high voltage on the program/erase gate line 32a).

Recently, new applications for split gate non-volatile memory cells have been developed that require each memory cell to be programmed to specific values (including analog values) for either multibit storage or analog signal storage. Specifically, analog signal storage involves programming memory cells anywhere along a continuous spectrum of program states extending from fully erased to fully programmed. Programming can be performed by programming the memory cells using one or more short program voltage pulses, followed by a program verify operation to confirm the program state of the memory cell. If the cell is insufficiently programmed, one or more additional program pulses are applied. This continues until the program verify operation confirms the cell has achieved the desired (i.e., target) program state. The program state corresponds to the number of electrons programmed onto the floating gate. A memory cell in its fully erased state has the lowest possible program state, and will provide the highest read current during a read operation. The higher the programming state of the memory cell (i.e., the more electrons programmed onto the floating gate 20), the lower the read current that will result during the read operation.

The memory cell read current (i.e., the electrical current through the channel region during a read operation) can be adversely affected by memory cell operating temperature. Specifically, if a memory cell is programmed at a relatively low temperature (e.g., around 30 degrees Celsius), then its desired read current is confirmed at an operating temperature of 30 degrees Celsius. However, if a read operation is later performed on the memory cell while operating closer to its highest rated operating temperature (e.g., around 85 degrees Celsius), the read current can be different (i.e., as the operating temperature rises, the read current for a memory cell programmed to a given program state can rise). This increase in read current can be problematic for applications where the memory cells are used for analog signal storage, where accuracy in the read operation is important.

There is a need for a memory cell device that provides compensation for the adverse effects of changing operating temperature.

BRIEF SUMMARY OF THE INVENTION

The aforementioned problems and needs are addressed by method of operating a plurality of memory cells that includes programming respective ones of the plurality of memory cells while at a first temperature to one of a plurality of different program states, wherein respective ones of the different program states are associated with a corresponding first read current value that is confirmed by performing a first read operation using nominal read conditions, determining modified read conditions using a second read operation for at least one of the memory cells while at a second temperature different than the first temperature, such that a second read current for the one memory cell using the modified read conditions in the second read operation is approximately equal to the first read current value for the one memory cell using the nominal read conditions in the first read operation, performing a third read operation on respective ones of the memory cells while at the second temperature using the modified read conditions to determine respective third read current values for the memory cells, determining error read current values for respective ones of the memory cells, which are the respective differences between the first read current values and the third read current values, and for respective ones of a plurality of target program states, assigning an upper program state and a lower program state to the target program state. A read current value for the assigned upper program state and a read current value for the assigned lower program state correspond approximately to one of the determined error read current values, and are separated approximately by a target read current value associated with the target program state.

A memory device includes a plurality of memory cells and circuitry. The circuitry is to program respective ones of the plurality of memory cells while at a first temperature to one of a plurality of different program states, wherein respective ones of the different program states are associated with a corresponding first read current value that is confirmed by a first read operation using nominal read conditions, determine modified read conditions using a second read operation for at least one of the memory cells while at a second temperature different than the first temperature, such that a second read current for the one memory cell using the modified read conditions in the second read operation is approximately equal to the first read current value for the one memory cell using the nominal read conditions in the first read operation, perform a third read operation on respective ones of the memory cells while at the second temperature using the modified read conditions to determine respective third read current values for the memory cells, determine error read current values for respective ones of the memory cells, which are the respective differences between the first read current values and the third read current values, and for respective ones of a plurality of target program states, assign an upper program state and a lower program state to the target program state. A read current value for the assigned upper program state and a read current value for the assigned lower program state correspond approximately to one of the determined error read current values, and are separated approximately by a target read current value associated with the target program state.

Other objects and features of the present invention will become apparent by a review of the specification, claims and appended figures.

BRIEF DESCRIPTION OF THE DRAWINGS

FIG. 15 is a table showing upper and lower program state assignments for desired program states.

DETAILED DESCRIPTION OF THE INVENTION

Figure 1:
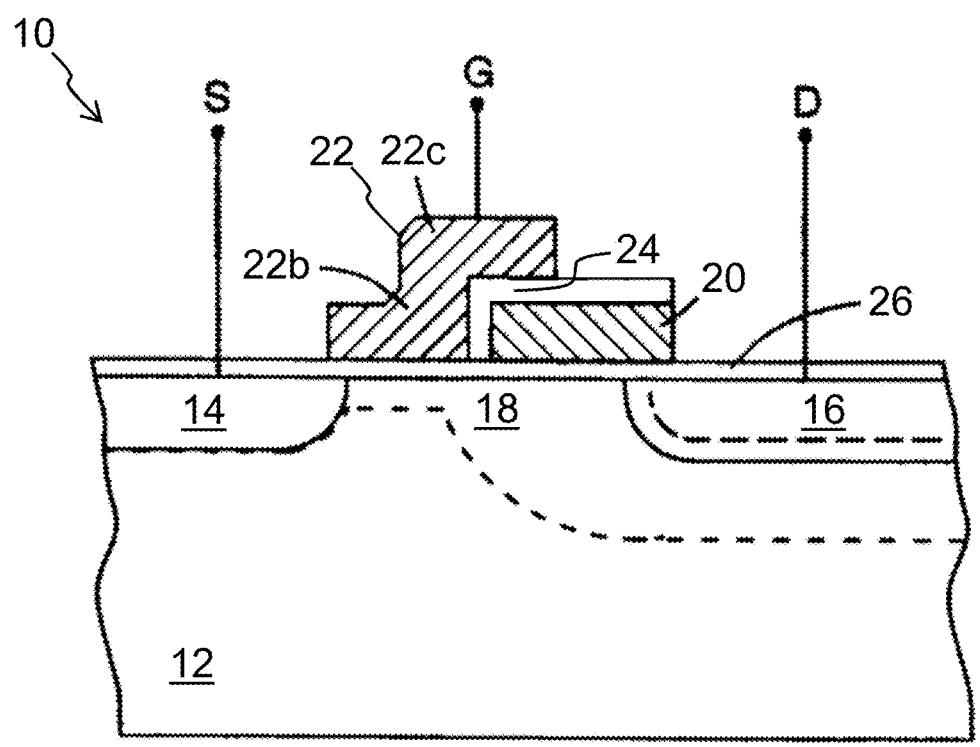
FIG. 1 is a side cross sectional view of a conventional 2-gate non-volatile memory cell.
Figure 2:
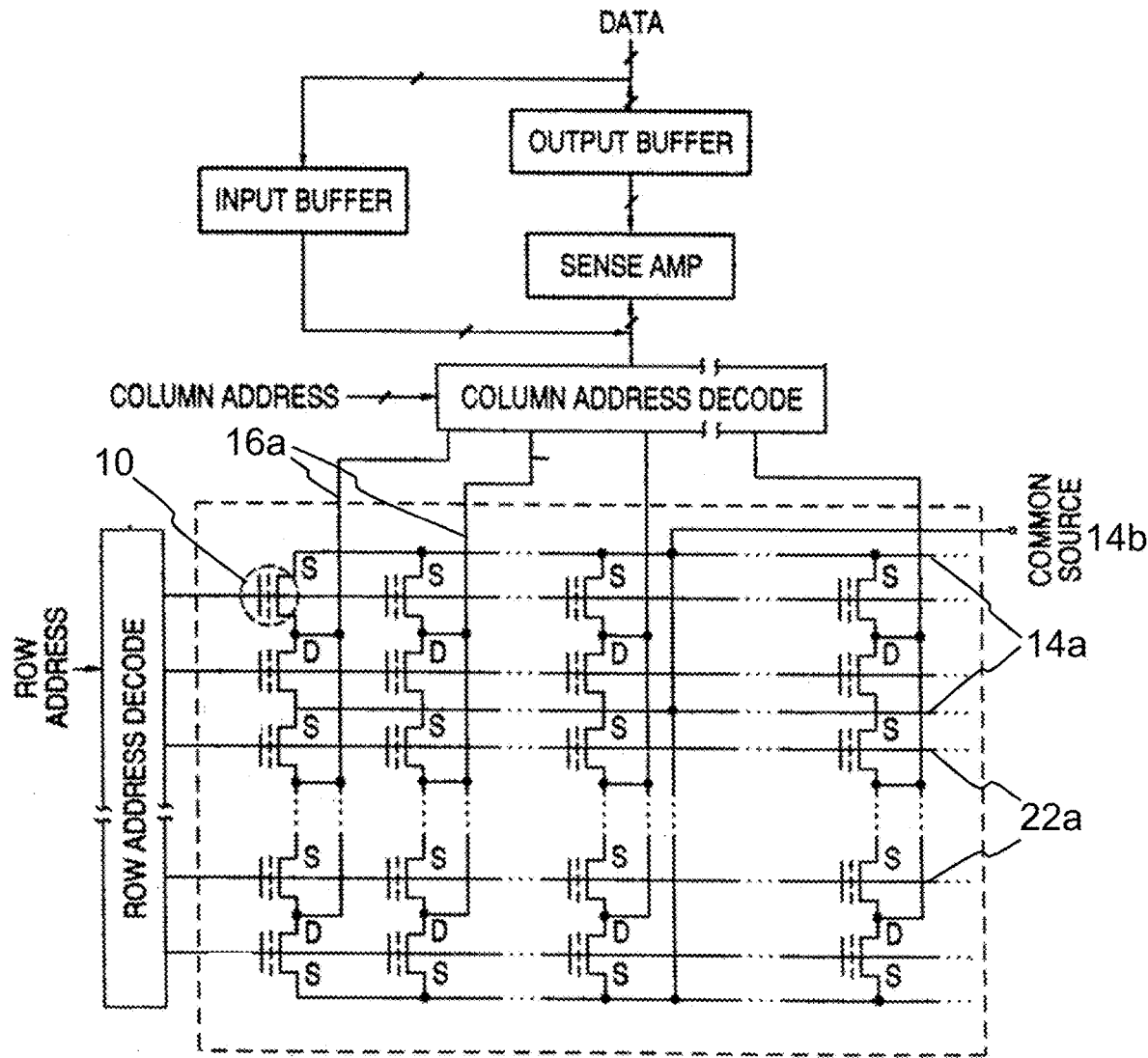
FIG. 2 is a schematic drawing of an array formed of the 2-gate non-volatile memory cell of FIG. 1.
Figure 3:
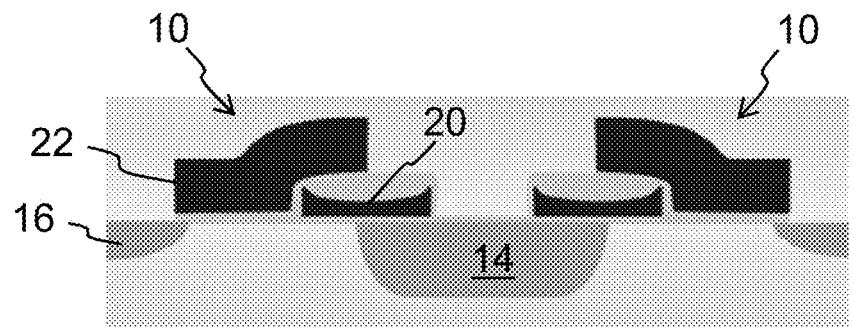
FIG. 3 is a side cross sectional view of another conventional pair of 2-gate non-volatile memory cells.
Figure 4:
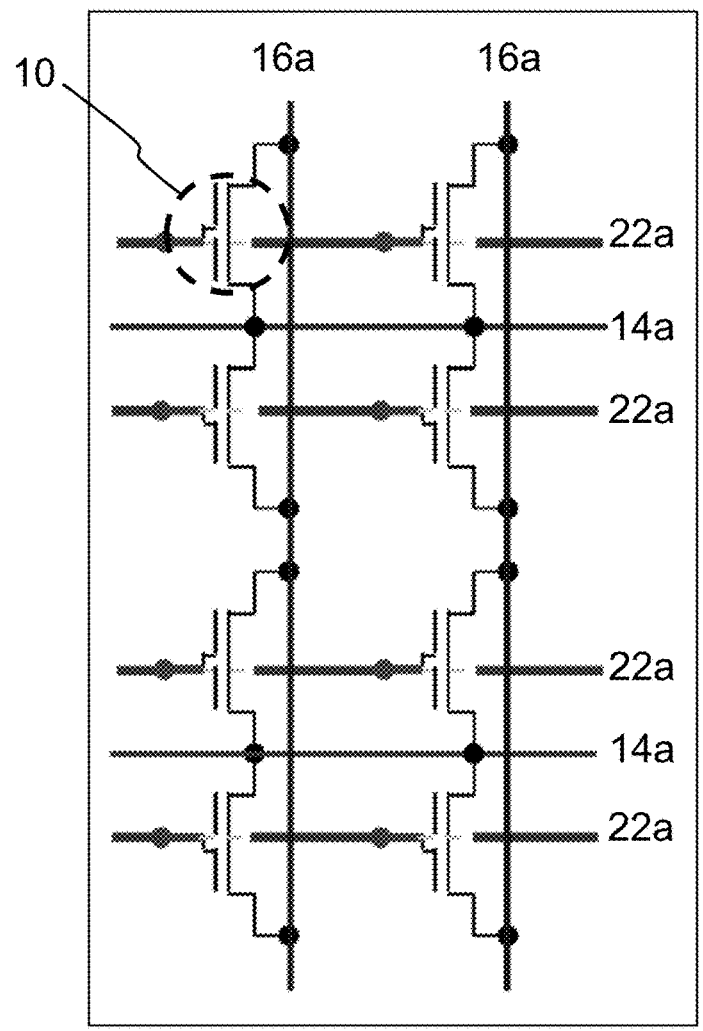
FIG. 4 is a schematic drawing of an array formed of the 2-gate non-volatile memory cell of FIG. 3.
Figure 5:
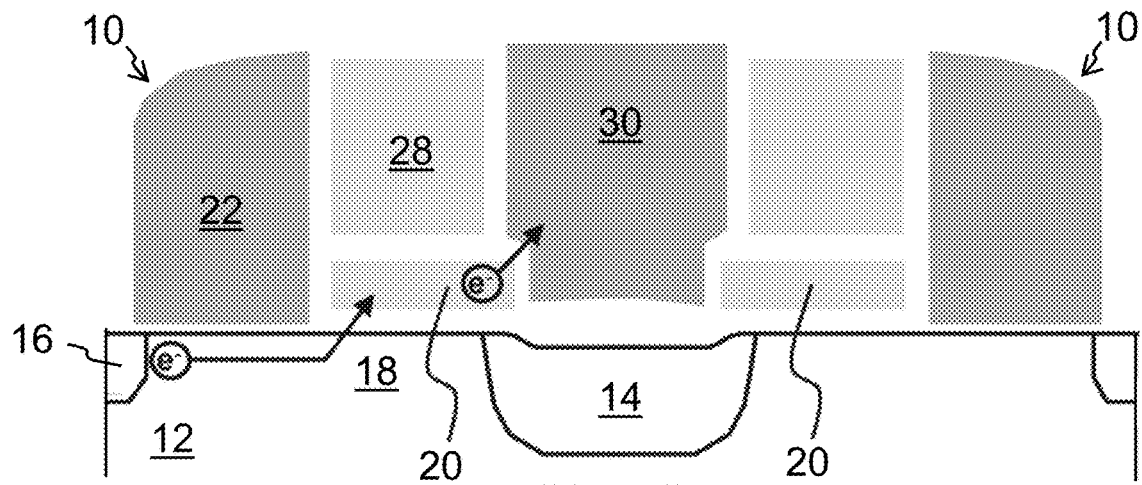
FIG. 5 is a side cross sectional view of a conventional 4-gate non-volatile memory cell.
Figure 6:
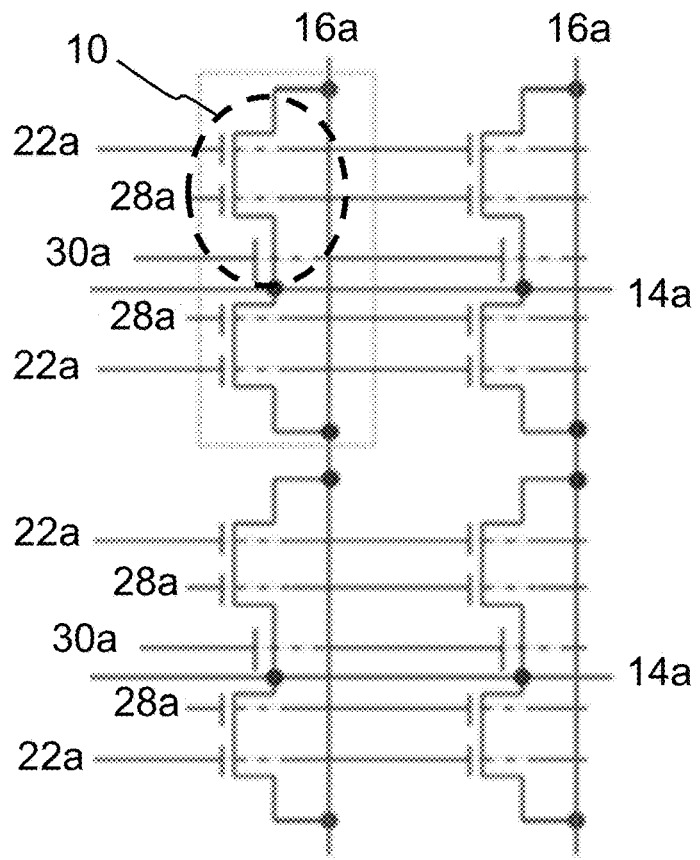
FIG. 6 is a schematic drawing of an array formed of the 4-gate non-volatile memory cell of FIG. 5.
Figure 7:
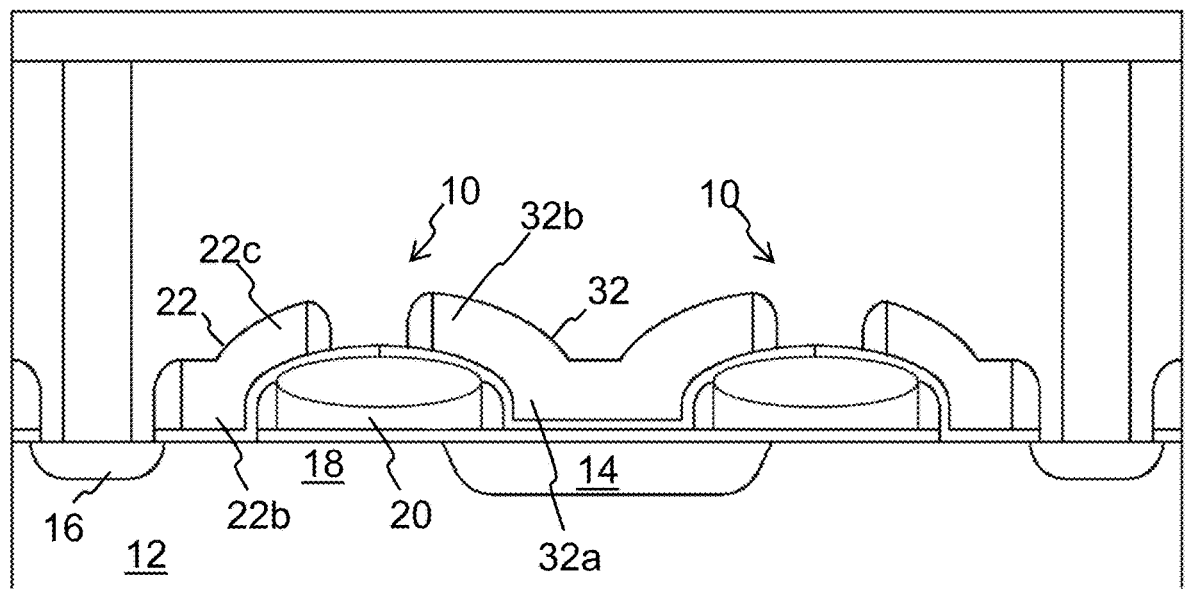
FIG. 7 is a side cross sectional view of a conventional 3-gate non-volatile memory cell.
Figure 8:
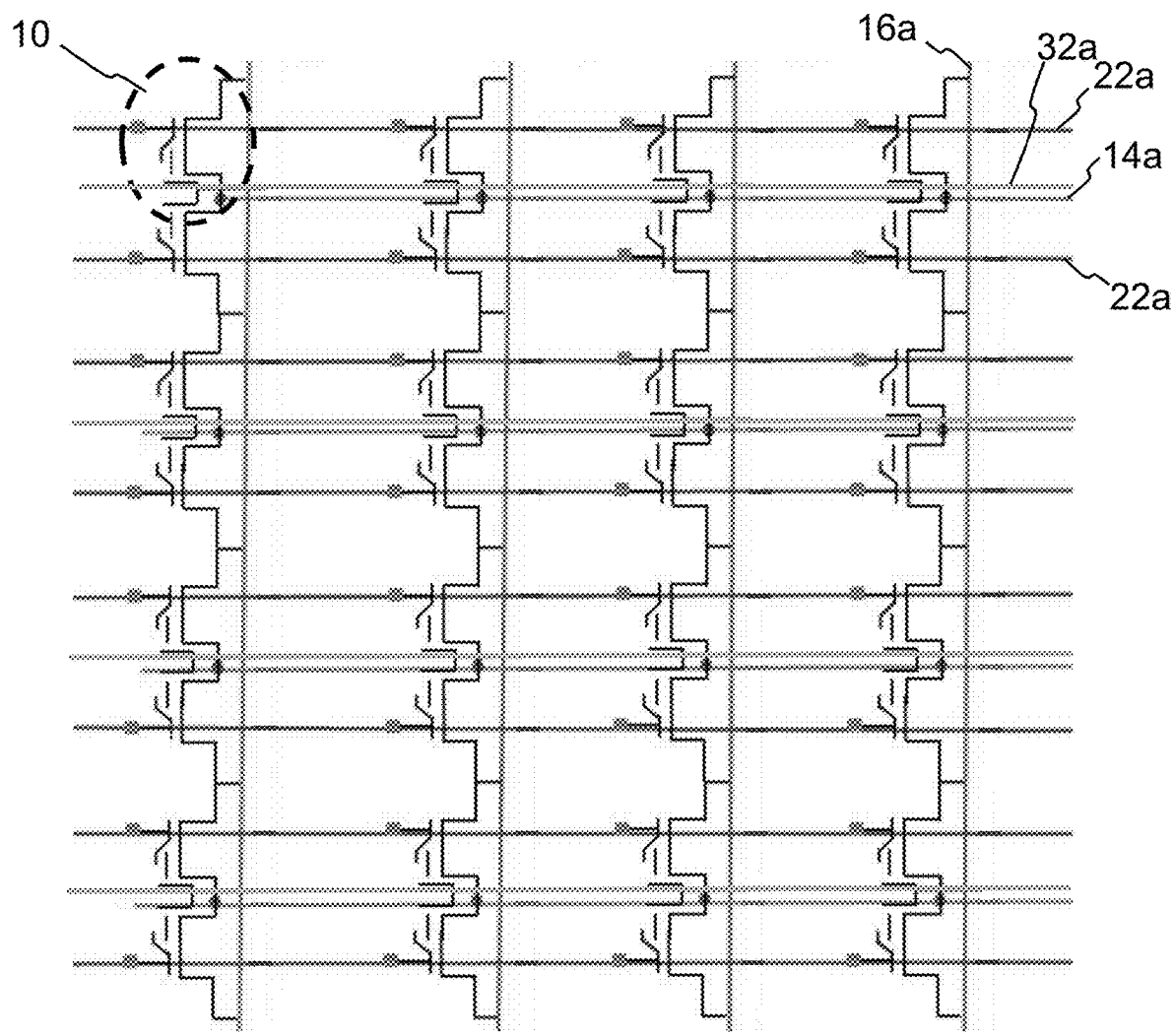
FIG. 8 is a schematic drawing of an array formed of the 3-gate non-volatile memory cell of FIG. 7.
Figure 9:
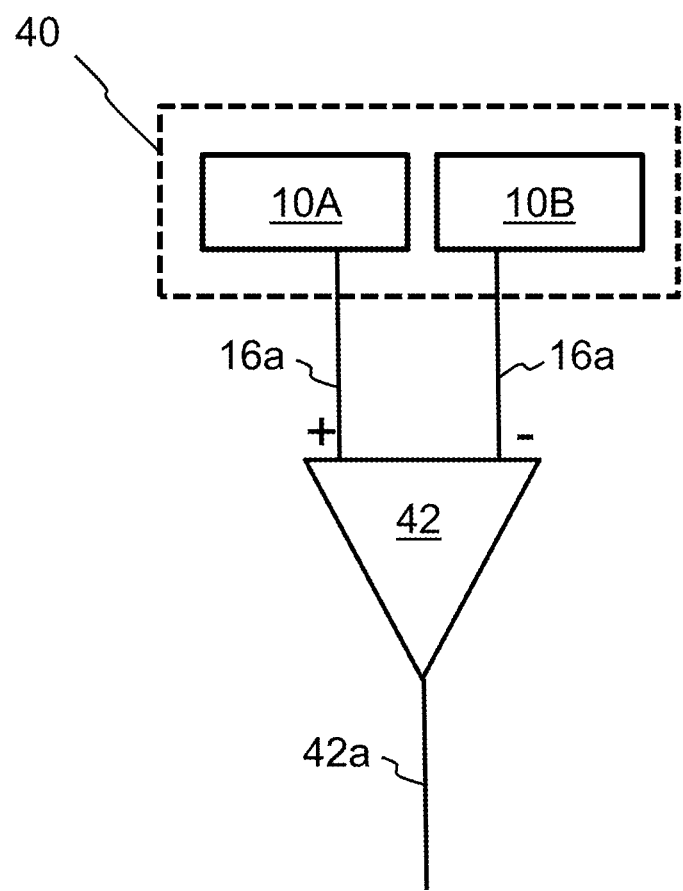
FIG. 9 is a schematic drawing of a supercell connected to a differential sense amplifier.

Disclosed herein is an architecture configuration and techniques for temperature compensation for memory devices with an array of split-gate non-volatile memory cells. The architecture involves pairs of memory cells (each pair of memory cells 10A and 10B is referred to collectively as "supercell" 40), where the read current outputs of the memory cell pair are provided as inputs to a differential sense amplifier 42, as shown in FIG. 9. The output 42*a* of differential sense amplifier 42 is based on the amplitude of the signal (i.e., read current) on the positive (+) amplifier input subtracted by the amplitude of the signal (i.e., read current) on the negative (−) amplifier input. The output of Cell 10A (i.e., its bit line 16*a*) is connected to the positive (+) amplifier input, and the output of cell 10B (i.e., its bit line 16*a*) is connected to the negative (−) amplifier input, whereby the amplitude of the signal on output 42*a* of the differential sense amplifier 42 is derived from the amplitude of the signal (read current) generated by Cell 10A subtracted by the amplitude of the signal (read current) generated by Cell 10B. It should be noted that the differential sense amplifier 42 preferably amplifies the signals on the bit lines (either before or after subtraction), so they are more easily detected and used. Therefore, the amplitude of the signal on output 42a need not be the actual difference between the signals on the bit lines 16a, but rather may have an amplified value that is based on (e.g., proportional to, offset relative to, linearly increased relative to, otherwise derived from, without limitation) the difference between the signal amplitudes on bit lines 16a. The adverse effects of changing operating temperature can be reduced by storing a program state in supercell 40, as opposed to just in a single memory cell. For example, if it is desired that the program state provide a read current of 4 nA, then Cell 10A can be programmed to an upper program state corresponding to 6 nA, and Cell 10B can be programmed to a lower program state corresponding to 2 nA. During a subsequent read operation of supercell 40, the resulting read current from the supercell 40 would be 4 nA (6 nA minus 2 nA, where the subtraction can be performed by the differential sense amplifier 42). If the programming is performed at room temperature, but the subsequent read operation is performed at an elevated operating temperature, the elevated operating temperature can result in increasing the read currents for both Cell 10A and Cell 10B, and therefore any increase to the read current for Cell 10A can be at least partially offset by any increase to the read current for Cell 10B, thus resulting in a lower overall read current increase for the supercell 40 caused by the temperature increase.

Figure 10:
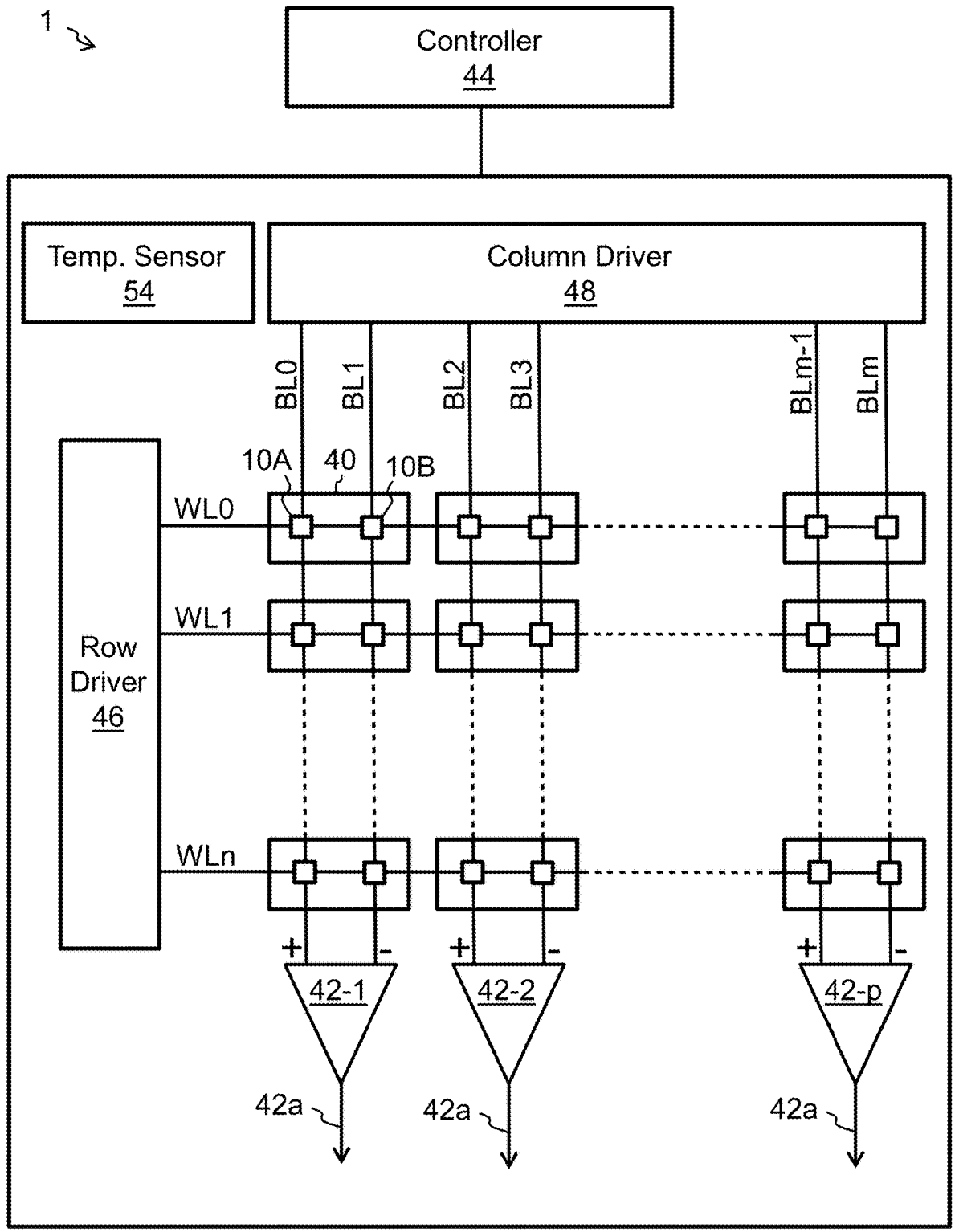
FIG. 10 is a schematic drawing of an array of supercells connected to differential sense amplifiers.

FIG. 10 illustrates a memory device 1 with an array of the supercells 40 operating under the control of a controller 44 (i.e., controller 44 is circuitry that controls the other circuits such as row driver 46 and column driver 48, without limitation, that provide the various voltages to various memory array lines such as word lines WL, bit lines BL, and source lines, without limitation, for reading, programming and erasing the memory cells,), with each supercell 40 including a pair of memory cells 10A and 10B. The memory cells are arranged in rows and columns, and can be any non-volatile memory cells such as the 2-gate, 3-gate or 4-gate memory cells described above with respect to FIGS. 1, 3, 5 and 7, that use a floating gate to control current flow through the channel region, including stacked gate memory cells where the floating gate extends along the entire channel region. The memory array includes word lines WL0-WLn (respectively connected to the control gates 22 of one row of memory cells and connected to row driver 46 which supplies the operational voltages thereto) and bit lines BL0-BLm (respectively connected to the drain regions 16 of one column of memory cells and connected to column driver 48 which supplies the operational voltages thereto). Specifically, bit lines BL0 and BL1 are respectively connected to the first two columns of memory cells, where respective rows of such cells contains a pair of memory cells 10A and 10B forming one supercell 40. Therefore, there is a column of supercells 40 connected to bit lines BL0 and BL1. There are differential sense amplifiers 42-1 to 42-p, with differential sense amplifier 42-1 connected to bit lines BL0 and BL1 (with bit line BL0 connected to one of the inputs (e.g., the positive input) of the differential sense amplifier 42-1, and bit line BL1 connected to the other one of the inputs (e.g., the negative input) of the differential sense amplifier 42-1), differential sense amplifier 42-2 connected to bit lines BL2 and BL3, and so on. By activating the appropriate word line WL and bit lines BL, a respective supercell 40 can be individually programmed and read. For example, placing WL0 at the read voltage (with all other word lines held below read voltage), the first row of supercells 40 can be individually read by differential sense amplifiers 42-1 to 42-p. A temperature sensor 56 can be included on-chip to measure the temperature of the device during operation, and controller 44 can be configured to provide temperature compensation during any of the program, read and erase operations.

Figure 11:
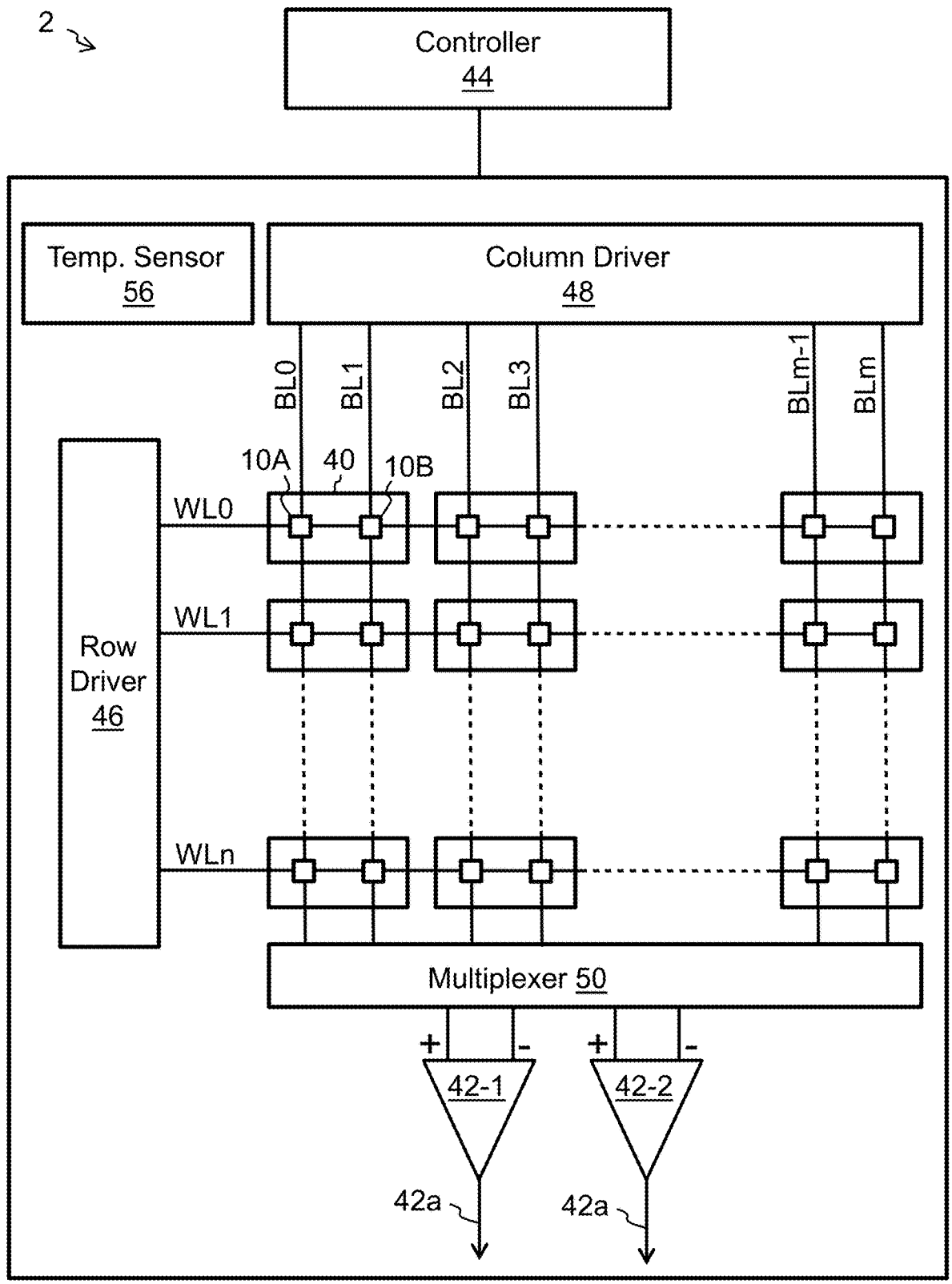
FIG. 11 is a schematic drawing of an alternate example of an array of supercells.

FIG. 11 illustrates an alternate example, where the memory device 2 includes a multiplexer 50 on the bit lines between the supercells 40 and the differential sense amplifiers 42. The multiplexer 50 selectively forwards the signals on any two bit lines to one of the differential sense amplifiers. Using a multiplexer allows for fewer differential sense amplifiers than the number of bit line pairs in the array. For example, in FIG. 10, where there are m bit lines, there are p differential sense amplifiers, where p is m/2. However, in FIG. 11, there are only two differential sense amplifiers for the array, reducing the size, complexity and cost of the device. While FIG. 11 shows two sense amplifiers 42 connected to the multiplexer 50, any number of differential sense amplifiers 42 can be used, from a single sense amplifier 42 to as many as m/2 sense amplifiers.

Figure 12:
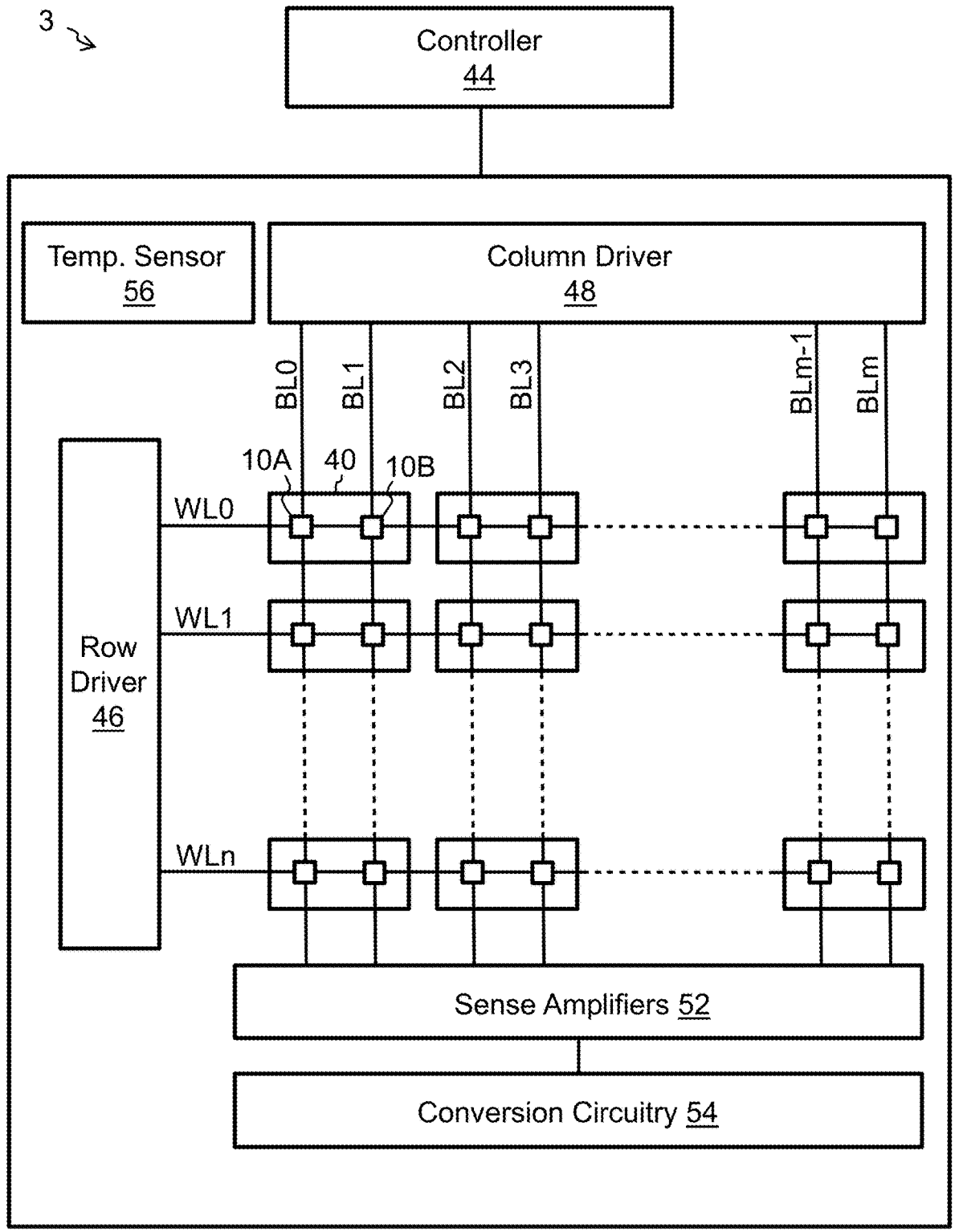
FIG. 12 is a schematic drawing of another alternate example of an array of supercells.

FIG. 12 illustrates another alternate example, where the memory device 3 includes sense amplifiers 52 that individually sense and amplify the bit line voltages during read operations. The sensed voltages are then provided to conversion circuitry 54 which performs the subtraction of signal values on odd numbered bit lines from signal values on even numbered bit lines (which even numbered bit lines include the 0 bit line), to determine the read values for the supercells 40.

Figure 13:
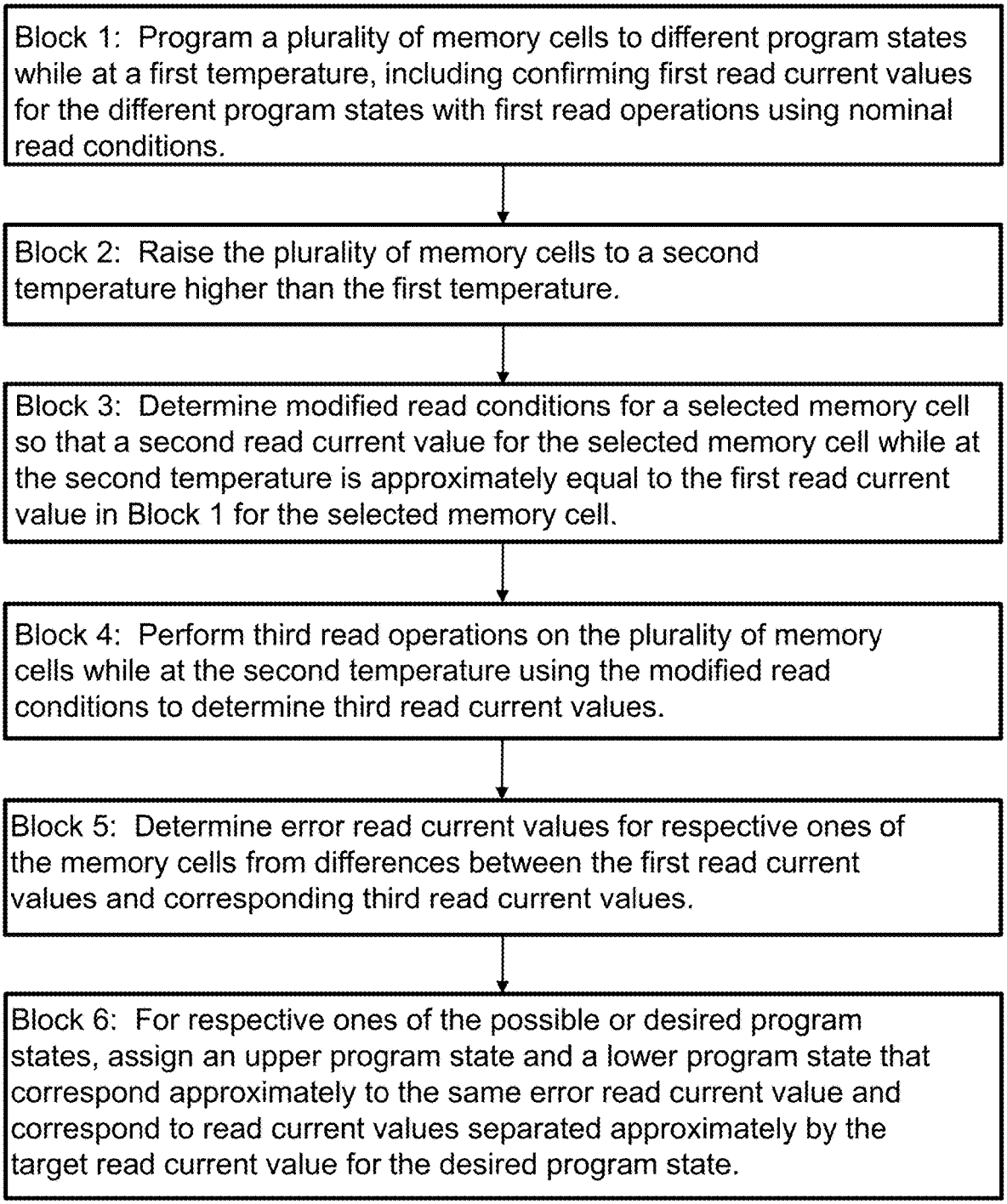
FIG. 13 is a diagram illustrating blocks used to assign program state pairs to desired program states.

Using supercells and differential sense amplifiers to store program states to alleviate the problems of overprogramming is known. See for example U.S. Pat. No. 10,586,598, which is incorporated herein for all purposes. However, it has been discovered by the present inventors that the read current error caused by changes in operating temperature varies as a function of program state. Moreover, the amount of read current error as a function of operating temperature and program state is not a linear function that can be effectively addressed with linear approximations. Therefore, a more effective temperature compensation method has been developed, as shown in FIG. 13 and described below.

In Block 1, a plurality of memory cells are programmed to different program states while at a first temperature. The first temperature can be confirmed by a temperature sensor 56. The program operation includes first read operations using nominal read conditions (i.e., using the nominal voltages used to read the memory cells during normal user operation) to confirm the desired (i.e., target) program states have been achieved. As a nonlimiting example, memory cells can be programmed to program states corresponding to target read current values in a range between 1-100 nA, where a first memory cell can be programmed to a first program state corresponding to a read current value of 1 nA, a second memory cell can be programmed to a second program state corresponding to a read current value of 2 nA, and so on up to a hundredth memory cell that can be programmed to a hundredth program state corresponding to a read current value of 100 nA. The first read operations can be used as part of the program operation to confirm the desired first read current values, and thus the desired program states, have been achieved. The first read current values confirmed in the first read operations for the plurality of memory cells can be stored in a table.

In Block 2, the plurality of memory cells are raised to a second temperature (higher than the first temperature). The second temperature can be confirmed by temperature sensor 56. Both the first and second temperatures can be within the specified operating range of the memory device during normal user operation. In one example the range of temperatures between the first and second temperatures encompass a broad range covering typical memory device operation. A non-limiting example can have the first temperature be around room temperature such as 30 degrees Celsius, and the second temperature be around an elevated temperature such as 85 degrees Celsius.

In Block 3, modified read conditions are determined using a selected one of the plurality of memory cells programmed in Block 1, whereby the read conditions are modified until a resulting read current value at the second temperature is approximately equal to a corresponding first read current value at the first temperature using the nominal read conditions for the selected memory cell (still at its programmed state of Block 1). This determination is achieved by performing a second read operation on the selected memory cell, where the read conditions of the second read operation are modified relative to the nominal read conditions of the first read operation (i.e., one or more of the read voltages are modified relative to their nominal values) until a second read current value (during the second read operation using modified read conditions at the second temperature) for the selected memory cell is approximately equal to the corresponding first read current value for the selected memory cell (during the first read operation in Block 1 using nominal read conditions at the first temperature). As a non-limiting example, with respect to the four gate memory cell of FIG. 5, the modified read conditions could include a voltage on the coupling gate 28 that is lower than its nominal voltage, a voltage on the erase gate 30 that is lower than its nominal voltage, or both. The desired effect here is to use modified read conditions to produce a second read current value at the higher second temperature that matches the first read current value of the first read operation (using nominal read conditions) at the lower first temperature for the same memory cell (at the same program state). More than one of the plurality of memory cells can be selected here, where the determined modified read conditions are averaged.

In one example, the memory cell selected for Block 3 is the memory cell having the highest program state relative to the program states for the other memory cells of the plurality of memory cells programmed in Block 1. As used herein, program state corresponds to the number of electrons programmed onto the floating gate, where the more electrons on the floating gate, the lower the programming state and the lower the read current value; and conversely, the fewer electrons on the floating gate, the higher the programming state and the higher the read current.

In Block 4, third read operations are performed on the plurality of memory cells while at the second temperature using the modified read conditions determined in Block 3 to determine third read current values. The third read current values determined during the third read operations for the plurality of memory cells can be stored in a table.

In Block 5, the read current values of Blocks 1 and 4 are compared to each other to determine error read current values for respective ones of the plurality of memory cells. Specifically, for respective ones of the plurality of memory cells, the read current value from the first read operation in Block 1 (using nominal read conditions) is compared to the corresponding read current value for the respective memory cell from the third read operations in Block 4 (using the modified read conditions determined in Block 3), where the difference between the two values represents the error read current value. The error read current values can be stored in a table.

Figure 14:
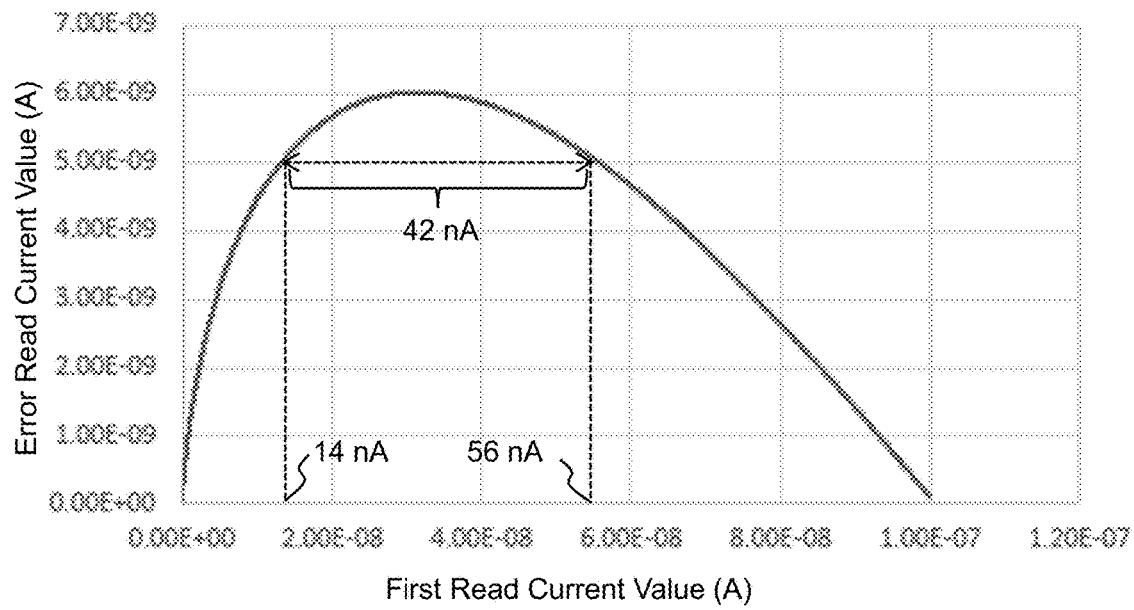
FIG. 14 is a graph showing error read current values as a function of first read current values.

FIG. 14 is a graph illustrating the read current error values as a function of first read current value according to one example. In this non-limiting example, Block 1 was performed at a first temperature of 30 degrees Celsius on 100 memory cells programmed between 1 nA and 100 nA in increments of 1 nA, Block 2 was performed by raising the temperature to a second temperature of 85 degrees Celsius, Block 3 was performed using the memory cell having the highest program state (i.e., the memory cell programed to have a 100 nA read current value during nominal read conditions while at the first temperature), and Block 5 was performed using the first read current values and the third read current values from Blocks 1 and 4 respectively. The error read current values in FIG. 14 reflect absolute error values with some temperature compensation because the third read currents are determined using modified read conditions so that there is no error read current value for the selected memory cell (in this case the memory cell programmed to the program state corresponding to a first read current value of 100 nA). For that first read current value from the one selected memory cell, the third read current value was made to be the same in Block 3, and therefore that is the one first read current value for which the read current error value is zero.

The continuous data curve in the graph of FIG. 14 can be generated from the error read current values of Block 5, and used to determine the assignments in Block 6, by, for example, polynomial fitting the error read current values to generate a polynomial equation in the form of $y=a_n X^n + a_{n-1} X^{n-1} + \ldots + a_2 x^2 + a_1 x + a_0$, that represents the error read current values determined in Block 5. The polynomial equation can be in the form of continuous function or a discrete function. This equation can be stored on-chip (by storing the polynomial coefficients).

As evident from FIG. 14, the error read current values define a bell-shaped error function that initially starts out low near the first read current value of 1 nA, rises with increasing first read current values with a peak at first read current value of approximately 30 nA, and then drops back down and eventually reaches zero at the first read current value of 100 nA. For any given error read current value below the maximum error read current value (at first read current value of approximately 30 nA), there are two corresponding first read current values having approximately the same error read current value. For example, as shown by the dotted lines in FIG. 14, first read current values 14 nA and 56 nA have approximately the same error read current value (e.g. 5 nA). Therefore, assigning 56 nA and 14 nA to individual cells of a supercell to represent a program state corresponding to a read current value of 42 nA (i.e., 56 nA minus 14 nA) would result in less temperature induced error than using other read current values to represent the same read current value of 42 nA.

Once the error function reflected in FIG. 14 is created (represented either by the error read current values of Block 5 or by a polynomial equation representing those values), it can then be used to assign the upper program state and lower program state pair used by the supercells to store each possible or desired program state. Specifically, in Block 6, for respective ones of the desired program states, an upper program state and a lower program state are assigned (to the desired program state of the supercell) where they (1) correspond to approximately the same error read current value and (2) correspond to read current values separated approximately by the target read current value TRCV (as would be determined using nominal read conditions) for the desired program state (i.e. the difference between the two read current values equals the target read current value TRCV for the desired program state). Using the example above, the upper program state corresponding to a read current value of 56 nA and the lower program state corresponding to a read current value of 14 nA would be assigned to the program state corresponding to a target read current value TRCV of 42 nA. The assignments of Block 6 can be stored in a table. It has been discovered that this assignment methodology results in less temperature induced errors when reading the supercells at different operating temperatures.

Figure 16:
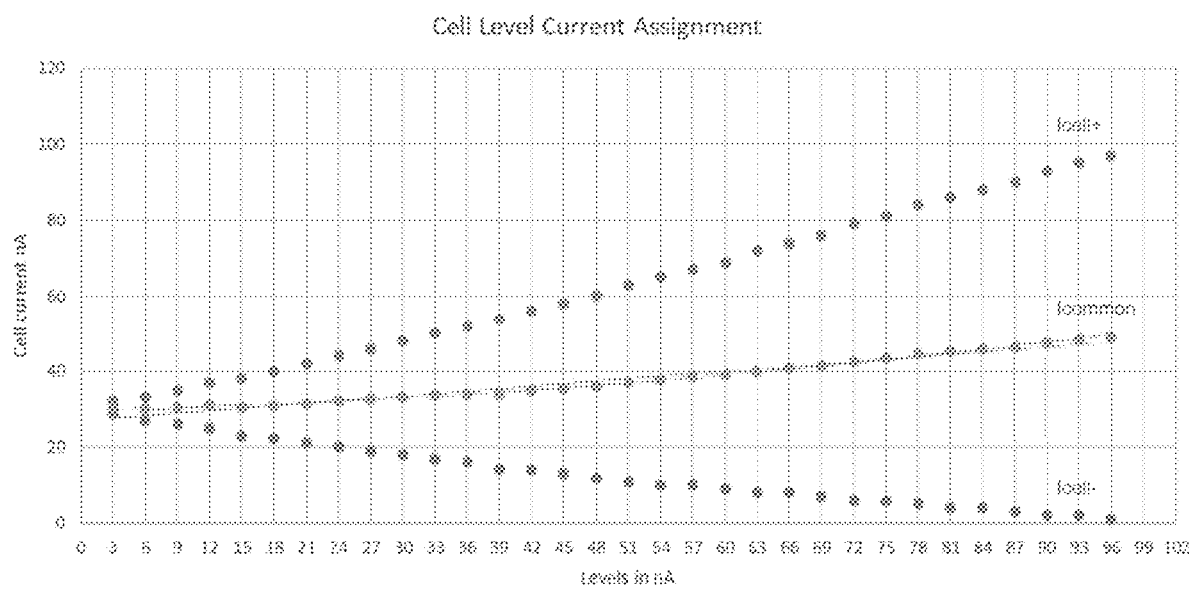
FIG. 16 is a graph showing upper and lower program state assignments for desired program states.

FIGS. 15-16 illustrate an example of assignments that can be generated in Block 6, where there are 32 desired program states (also referred to herein as program state levels), where respective program states have a target read current value TRCV. In this example, the target read current values TRCV for the program states are separated by 3 nA, where the first program state (level 0) corresponds to a target read current value TRCV of 3 nA, the second program state (level 1) corresponds to a target read current value TRCV of 6 nA, and so on up to the $32^{nd}$ program state (level 31) which corresponds to a target read current value TRCV of 96 nA. The upper program states have corresponding read current values Icell+ (representing positive weights w+ of a neural network), the lower program states have corresponding read current values Icell− (representing negative weights w− of a neural network), and the program states have target read current values TRCV (representing final weight w=w+ minus w−). For each assignment of upper and lower program states to a given program state, the difference between corresponding read current values is equal to the target read current value TRCV for the program state, and both the upper and lower program states correspond to approximately the same error read current value determined in Block 5.

As an alternate example, a polynomial fitting can be used to generate a first polynomial equation that represents a continuous data curve for all the Icell+ values, and a second polynomial equation that represents a continuous data curve for all the Icell− values, where these two polynomial equations can be used to generate the upper program state and lower program state assignments in Block 6 instead of using the raw data points or raw data point approximations. The first and second polynomial equations can be in the form of continuous function or a discrete function. This is advantageous for situations where there may not be data points precisely at some of the program state levels.

As another alternate example, as shown in FIG. 16, for respective program state levels, there can be a variable common current (Icommon) that is centered between the upper program state read current Icell+ and the lower program state read current Icell− (i.e., for any level, Icommon=(Icell+plus Icell−)/2). Variably common current Icommon can be represented as individual values saved in a table. Or, a polynomial fitting can be used to generate a polynomial equation that represents a continuous data curve for the variable common current (Icommon). The polynomial equation of Icommon can then be used to generate the upper program state and lower program state assignments in Block 6 instead of using the raw data points. For example, for any given program state level having a given target read current value TRCV, the assigned upper program state read current Icell+ would be equal to Icommon+TRCV/2, and the lower program state read current Icell− would be equal to Icommon−TRCV/2. The polynomial equation Icommon can be in the form of continuous function or a discrete function.

Figure 17:
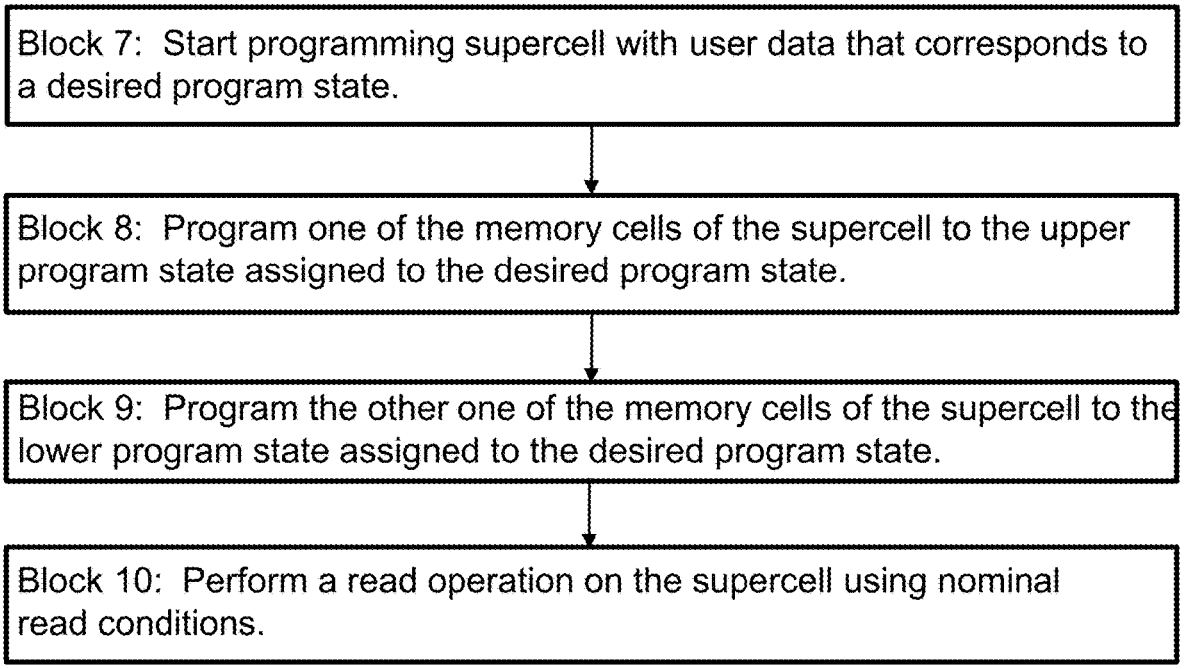
FIG. 17 is a diagram illustrating blocks used to program and read memory cells using assigned program state pairs for desired program states.

FIG. 17 illustrates user operation, where the supercells 40 are programmed with user data according to the assignments of Block 6, and later the programmed data is read out. Specifically, for programming a supercell 40 with user data corresponding to a desired program state (Block 7), one of the memory cells of the supercell 40 is programmed to the upper program state assigned to the desired program state (Block 8), and the other one of the memory cells of the supercell 40 is programmed to the lower programming state assigned to the desired program state (Block 9). Programming can include read operation(s), using nominal read conditions, to confirm that the upper program state and lower program state assigned to the desired program state have been achieved. Then, at some time later (Block 10), the user data stored in the supercell 40 is read out in a read operation using nominal read conditions, in which the difference between the read current values of the memory cell programmed to the upper program state and the memory cell programmed to the lower program state for the supercell is determined (e.g., by using a differential sense amplifier 42).

Figure 18:
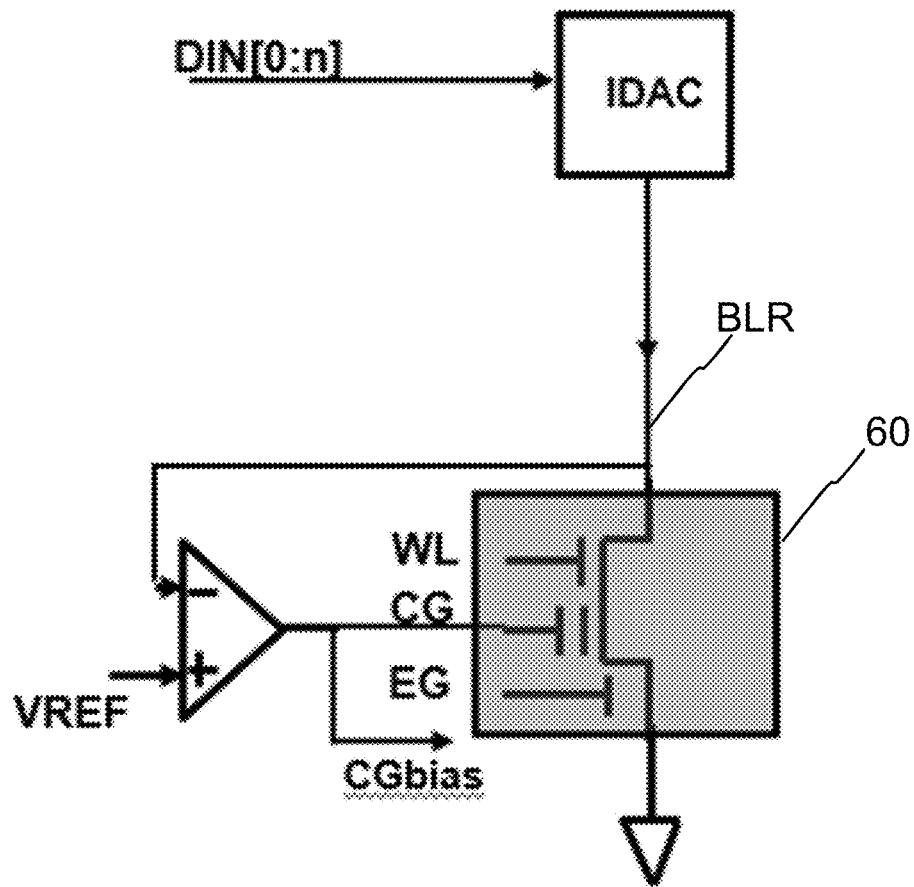
FIG. 18 is a schematic drawing illustrating a reference memory cell.

FIG. 18 illustrates another example, where a reference memory cell 60 on the same chip as the supercells 40 is used as the selected memory cell in Block 3 for determining the modified read conditions at the first and second temperatures, instead of using one of the memory cells in the memory array that is later used to store user data. Specifically, the reference memory cell 60 may have the same configuration as memory cells 10, but can be located outside of the memory array containing memory cells 10 (i.e., with a separate bit line BLR, a separate word line WLR, and separate lines for gates such as control gate 28 and erase gate 30). The reference memory cells 60 can be programmed to a reference program state while at the first temperature, where the reference program state could be even higher than the program states of the plurality of memory cells programmed in Block 1. The temperature for the reference memory cell 60 is raised to a second temperature, and the second read operation is performed on the reference memory cell 60, where the read conditions of the second read operation are modified relative to the nominal read conditions of the first read operation so that a second read current value for the reference memory cell 60 is approximately equal to the corresponding first read current value for the reference memory cell 60. The advantage of using the reference memory cell 60 is that it's programming state need not be changed during operation, and the programming state can be higher than any of the nominal programming states used to store user data (i.e., the reference memory cell 60 could be deeply erased).

It should be noted that any number of the memory cells on a single chip or in a single array can be used for the above described technique, not just the example of 100 memory cells described above, and certainly not necessarily all the memory cells on a given chip. It should be further noted that accuracy can be enhanced by, for example, in Block 1, programming multiple memory cells to each of the different program states (e.g., 8 or 16 memory cells for each of the program states), whereby the determination of the error read current values for each program state in Block 5 can be determined by averaging the third read currents in Block 4 among all the memory cells associated with that program state. Doing so would average out any small cell to cell variations. Accuracy can also be enhanced by performing the first read operation on each memory cell multiple times and averaging the results in Block 1 to confirm the different program states were achieved, as well as performing the third read operation on each memory cell multiple times and averaging the results to determine the third read current values in Block 4 for use in determining the error read current values in Block 5.

This technique can be done once for any particular chip design by characterizing one or more representative samples of the chip and extrapolated to other same or similar chip designs, or the technique can be applied to each individually manufactured chip. The techniques of Blocks 1 and 3-10 can be implemented by the circuitry of controller 44.

It is to be understood that the present invention is not limited to the example(s) described above and illustrated herein, but encompasses any and all variations falling within the scope of any claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. Single layers of material could be formed as multiple layers of such or similar materials, and vice versa. Lastly, while the conversion circuitry 54 is shown as being separate from the sense amplifiers 52, the conversion circuitry 54 could be incorporated as part of the sense amplifier circuitry 52. Alternately, the conversion circuitry 54 could be incorporated as part of the controller 44. While the supercells are shown as two adjacent memory cells in the same row, the supercells could include two memory cells in different rows. For example, a supercell 40 could include the memory cell connected to word line WL0 and bit line BL0 and the memory cell connected to word line WL1 and BL1. In fact, the pairing of memory cells to form the super cells 40 for bit lines BL0 and BL1 could include pairing any one of the memory cells connected to bit line BL0 with any one of the memory cells connected to bit line BL1.

What is claimed is:

1. A method of operating a plurality of memory cells, comprising:
    programming respective ones of the plurality of memory cells while at a first temperature to one of a plurality of different program states, wherein respective ones of the different program states are associated with a corresponding first read current value that is confirmed by performing a first read operation using nominal read conditions;
    determining modified read conditions using a second read operation for at least one of the memory cells while at a second temperature different than the first temperature, such that a second read current for the one memory cell using the modified read conditions in the second read operation is equal to the first read current value for the one memory cell using the nominal read conditions in the first read operation;
    performing a third read operation on respective ones of the memory cells while at the second temperature using the modified read conditions to determine respective third read current values for the memory cells;
    determining error read current values for respective ones of the memory cells, which are the respective differences between the first read current values and the third read current values; and
    for respective ones of a plurality of target program states, assigning an upper program state and a lower program state to the target program state, wherein a read current value for the assigned upper program state and a read current value for the assigned lower program state:
        correspond to one of the determined error read current values, and
        are separated by a target read current value associated with the target program state.

2. The method of claim 1, wherein the second temperature is higher than the first temperature.

3. The method of claim 1, comprising:
    programming user data that corresponds to one of the target program states using a first memory cell and a second memory cell of the plurality of memory cells by programming the first memory cell to the upper program state assigned to the target one of the program states and programming the second memory cell to the lower program state assigned to the target one of the program states.

4. The method of claim 3, comprising:
    reading the user data from the first memory cell and the second memory cell in a read operation by:
        determining a first read current value for the first memory cell using the nominal read conditions,
        determining a second read current value for the second memory cell using the nominal read conditions, and
        subtracting the second read current value from the first read current value.

5. The method of claim 4, wherein the subtracting is performed using a differential sense amplifier.

6. The method of claim 1, wherein the programming respective ones of the plurality of memory cells to one of a plurality of different program states comprises programming the one memory cell used for the second read operation to one of the different program states that is a highest program state relative to the different program states programmed to others of the plurality of memory cells.

7. The method of claim 1, comprising:
    generating a polynomial equation representing the respective differences between the first read current values and the third read current values.

8. The method of claim 7, wherein the assigning the upper program state and the lower program state is performed using the polynomial equation.

9. The method of claim 1, wherein the assigning the upper program states and the lower program states comprises:
    generating a first polynomial equation representing the upper program states for the plurality of target program states;
    generating a second polynomial equation representing the lower program states for the plurality of target program states; and
    using the first polynomial equation and the second polynomial equation for the assigning of the upper program states and the lower program states for the target program states.

10. The method of claim 1, wherein the assigning the upper program states and the lower program states comprises:
    generating a polynomial equation representing a variable common current that is centered between the read current value of the upper program state and the read current value of the lower program state for respective ones of the target program states; and
    using the polynomial equation for the assigning of the upper program states and the lower program states for the target program states.

11. A memory device, comprising:
    a plurality of memory cells; and
    circuitry to:

program respective ones of the plurality of memory cells while at a first temperature to one of a plurality of different program states, wherein respective ones of the different program states are associated with a corresponding first read current value that is confirmed by a first read operation using nominal read conditions;

determine modified read conditions using a second read operation for at least one of the memory cells while at a second temperature different than the first temperature, such that a second read current for the one memory cell using the modified read conditions in the second read operation is equal to the first read current value for the one memory cell using the nominal read conditions in the first read operation;

perform a third read operation on respective ones of the memory cells while at the second temperature using the modified read conditions to determine respective third read current values for the memory cells;

determine error read current values for respective ones of the memory cells, which are the respective differences between the first read current values and the third read current values; and for respective ones of a plurality of target program states, assign an upper program state and a lower program state to the target program state, wherein a read current value for the assigned upper program state and a read current value for the assigned lower program state:

correspond to one of the determined error read current values, and are separated by a target read current value associated with the target program state.

12. The memory device of claim 11, wherein the second temperature is higher than the first temperature.

13. The memory device of claim 11, wherein the circuitry is to:

program user data that corresponds to one of the target program states using a first memory cell and a second memory cell of the plurality of memory cells including program the first memory cell to the upper program state assigned to the target one of the program states and program the second memory cell to the lower program state assigned to the target one of the program states.

14. The memory device of claim 13, wherein the circuitry is to:

read the user data from the first memory cell and the second memory cell in a read operation including:

determine a first read current value for the first memory cell using the nominal read conditions, determine a second read current value for the second memory cell using the nominal read conditions, and subtract the second read current value from the first read current value.

15. The memory device of claim 14, comprising:

a differential sense amplifier for performing the subtracting.

16. The memory device of claim 11, wherein the program of respective ones of the plurality of memory cells to one of a plurality of different program states comprises program the one memory cell used for the second read operation to one of the different program states that is a highest program state relative to the different program states programmed to others of the plurality of memory cells.

17. The memory device of claim 11, wherein the circuitry is to:

generate a polynomial equation representing the respective differences between the first read current values and the third read current values.

18. The memory device of claim 17, wherein the circuitry is to:

assign the upper program state and the lower program state using the polynomial equation.

19. The memory device of claim 11, wherein the circuitry is to assign the upper program states and the lower program states including:

generate a first polynomial equation representing the upper program states for the plurality of target program states;

generate a second polynomial equation representing the lower program states for the plurality of target program states; and use the first polynomial equation and the second polynomial equation to assign the upper program states and the lower program states for the target program states.

20. The memory device of claim 11, wherein the circuitry is to assign the upper program states and the lower program states including:

generate a polynomial equation representing a variable common current that is centered between the read current value of the upper program state and the read current value of the lower program state for respective ones of the target program states; and use the polynomial equation to assign the upper program states and the lower program states for the target program states.

* * * * *